United States Patent Office 2,894,806
Patented July 14, 1959

2,894,806

RECOVERY OF PROTACTINIUM FROM AQUEOUS SOLUTIONS

Robert E. Elson, Park Forest, Ill., assignor to the United States of America as represented by the United States Atomic Energy Commission No Drawing. Application April 11, 1951
Serial No. 220,531

5 Claims. (Cl. 23—14.5)

This invention relates to the recovery of protactinium from aqueous solutions and more particularly relates to the recovery of protactinium by solvent extraction methods from aqueous solutions containing protactinium values in complexed form.

Protactinium, the element having atomic number 91, is found naturally only in uranium ores. The protactinium is present in such ores in very small concentration, usually about 0.25 part protactinium per million parts of uranium. Consequently, recovery of protactinium from such ores is difficult. Recently, protactinium isotopes have been prepared by the neutron-irradiation of thorium. The neutron-irradiation of $Th^{230}$ masses results in the production of $Pa^{231}$ and the neutron-irradiation of $Th^{232}$ masses results in the production of $Pa^{233}$. However, these artificially produced isotopes are also always present in the neutron-irradiated thorium masses in very small concentration and similar careful techniques are required to recover these artificially produced protactinium isotopes in purified form. Protactinium is often a by-product of the recovery of other elements from the ores and neutron-irradiated thorium masses. One of the more widely accepted methods for the recovery of these types of materials comprises solvent extraction. The by-product wastes in solvent extraction methods for the treatment of uranium ores and neutron-irradiated thorium masses which contains the protactinium values is often an aqueous acidic solution wherein the protactinium is contained as a complex, such as the protactinium fluoride complex. The protactinium is exceptionally difficult to recover when it is in this state since the protactinium complex can neither be extracted with organic solvents by normal methods nor readily precipitated from the solution.

It is an object of the present invention to provide a method for the recovery of protactinium from aqueous solutions containing protactinium in the complexed form.

It is an additional object of the present invention to provide a method for the recovery of protactinium by solvent extraction means from an aqueous acidic solution containing complex protactinium fluoride ions.

Further objects will be apparent from the description of the present invention which follows.

Broadly, the process of the present invention comprises mixing an aqueous solution containing protactinium in a complexed form with an organic solvent which is specific for protactinium, then adjusting the acidity of the aqueous solution to a range suitable for the recovery of protactinium by the specific solvent, and contacting the mixture of aqueous and organic solvents with a reagent capable of decomposing the protactinium complex. Upon decomposition of the protactinium complex the protactinium ions will be taken up by the organic solvent, and the organic phase together with associated protactinium values is then separated from the aqueous phase.

The process of this invention may be applied to the recovery of protactinium from solutions containing protactinium in any of its complexed forms such as the oxalate, citrate, tartrate, chloride or fluoride but it is particularly adapted to the recovery of protactinium from solutions containing the fluoride complex thereof. The reagent employed to decompose the protactinium complex is normally one capable of furnishing an ion which will form a complex with the second element or radical of the protactinium complex, that is more stable than the complex formed with protactinium by said element or radical. Thus where the protactinium fluoride complex is present, a reagent capable of furnishing an aluminum ion may be employed since the aluminum fluoride complex is more stable than the protactinium fluoride complex, under the conditions contemplated.

The term "organic solvent specific for protactinium" as used in the specification and claims refers to those solvents known to the art which are capable of extracting protactinium values from aqueous solutions. There are, in general, three types of these organic solvents. The first type is the aliphatic oxygen-containing organic solvents having at least six carbon atoms and selected from the group consisting of alcohols, ketones and esters and mixtures thereof. Examples of suitable alcohols, ketones and esters are diisopropyl carbinol, n-heptanol, 2-ethyl hexanol, diisopropyl ketone, methyl isobutyl ketone and n-butyl acetate. The second type of organic solvent is an alkyl phosphate having approximately twelve or more carbon atoms. Examples of this type include tributyl phosphate, trioctyl phosphate, and dioctyl hydrogen phosphate. These alkyl phosphates are rather viscuous substances and it is customary to mix these solvents for protactinium with a diluent such as hexane, n-octane, diisopropyl carbinol or diisopropyl ketone. The third type of organic solvent is a mixture of an organic diluent and a fluorinated β-diketone. The best known ketone is 2-thenoyltrifluoroacetone. The diluents usually used with a β-diketone are benzene or one of the normally liquid alcohols or ketones mentioned above.

Although the steps of the process of the present invention may be carried out in any order, the preferable method is to mix the aqueous acidic solution containing the complexed protactinium ions with the organic solvent as the first step. The steps of adjustment of the acidity and the decomposition of the protactinium complex ion are then carried out and these two steps are preferably carried out in the above order or by the proper choice of reagents, simultaneously. The reason for the preferred order is due to the fact that the extractability of the protactinium following the decomposition of the protactinium fluoride complex drops off rapidly with time after the addition of the reagent employed to decompose the protactinium fluoride complex; a loss in extractability of 50% occurring in fifteen minutes. This loss in extractability may be due to the hydrolysis of the protactinium ion in aqueous solution. The mixing should be sufficiently thorough that the organic solvent and aqueous solution are in intimate contact at the time the acidity is adjusted and the protactinium fluoride complex decomposed. Although the contact time is not critical, a contact time of fifteen to thirty minutes appears to be optimum.

Where diisopropyl carbinol is used as the organic extractant, the aqueous acidic solutions containing the protactinium fluoride complex is usually more acid than is required for optimum extraction so that the acidity of the solution is normally reduced prior to the extraction of protactinium values. Although numerous alkaline reagents may be used to reduce the acidity, it has been found that a reagent which will reduce the acidity and at the same time furnish a source of aluminum ions which will decompose the protactinium fluoride complex is desirable. Aluminum hydroxide is one such reagent but sodium aluminate has been found to be preferable. The alkaline reagent should have a low heat of reaction.

Other alkali metal aluminates may also be employed. Where it is necessary to increase the acidity of the solution in order to obtain the optimum results with the particular solvent used, any mineral acid, the anion of which does not form a precipitate with protactinium, may be used.

The reagent which is employed to decompose the protactinium complex is one which will form a strong complex with the element or radical which is the other component of the protactinium complex. Thus, where the protactinium is present as a protactinium fluoride complex, it has been found that such fluoride complexing agents as iron, boric acid and aluminum are suitable complexing agents. Of these agents, aluminum has been found to be most desirable. The complexing agent is added in sufficient quantities to decompose the protactinium complex which is present. Thus, the addition of at least stoichiometric proportions of the complexing agent is desirable and it has been found preferable to use considerably greater than stoichiometric proportions of the complexing ion added to the ion to be complexed, for example of the order of three or four times stoichiometric proportions.

Further details of the present process will be apparent from the specific examples which follow. These examples are concerned with the recovery of protactinium from an aqueous solution having a nitric acid concentration of 3.0 M and a fluoride concentration of approximately 0.2 M. Major constituents of the solution in mg./ml. were: Ca, 20; rare earths, >4; Na, 1.2; Fe, 1; Al, 0.8; and Ba, Cb, Mg, Ni, Pb and V, about 0.1 to 0.6. The protactinium concentration was about 0.8 $\mu$g./ml.

*Example I*

Ten ml. of the above-mentioned protactinium fluoride aqueous solution was mixed with 6 ml. of diisopropyl carbinol. To this mixture was then added 0.45 g. of aluminum nitrate and 0.65 g. of sodium aluminate. The mixture was then agitated for about fifteen minutes so that the organic and aqueous phases were maintained in intimate contact during that time. The phases were then allowed to separate and a 50-microliter sample of the organic phase was analyzed both by radiometric analysis and by pulse analysis. The 50-microliter sample was found to contain 2,052 counts/min. A pulse analysis was then made and it was determined that 97% of the protactinium had been extracted from the aqueous solution.

Numerous additional experiments were carried out with the extraction of protactinium from the protactinium fluoride complex into diisopropyl carbinol and it was found that with a constant concentration of added aluminum nitrate the extractability of protactinium increases with decreasing acidity down to about 0.9 M in the aqueous phase and then remains constant to about 0.3 M acidity. At constant concentration of nitric acid the extractability increases linearly with aluminum concentration to about 0.5 to 0.6 M where the aluminum: fluoride ratio is 3:1, increases more slowly from 0.6 to 1.1 M and finally reaches a plateau at about 1.1 to 1.2 M. Thus, the optimum conditions for the recovery of fluoride-complexed protactinium from the solution described above using diisopropyl carbinol as the extractant was a hydrogen ion concentration of about 0.5 to 0.8 M and a 1.0 to 1.2 M aluminum ion concentration (a 0.6 M excess of aluminum over the 3:1 ratio of aluminum: fluoride).

The protactinium can be removed from the diisopropyl carbinol or other organic solvent by contacting the organic solvent containing the protactinium with hydrogen peroxide, sodium sulfate or potassium oxalate. Peroxide is effective in a concentration of 10%, in as low a volume as one-fiftieth of the carbinol while sulfate and oxalate could be used to at least one-twentieth. Prior to removal of the protactinium, the diisopropyl carbinol could be washed with a one-fifth-volume wash of 3 M nitric acid or 0.5 to 3 M nitric acid containing aluminum nitrate with losses of less than 5%.

An additional example of the recovery of protactinium from a protactinium fluoride solution with diisopropyl carbinol follows.

*Example II*

A 4.6-liter sample of the aqueous nitric acid solution containing protactinium fluoride complex described above was mixed with 2.4 liters of diisopropyl carbinol. A 1.3-kg. quantity of aluminum nitrate and 250 g. of sodium aluminate were then added to the mixture to give a final hydrogen ion concentration of 0.6 M and aluminum ion concentration of approximately 1.4 M. The mixture was maintained in intimate contact for thirty minutes. The two phases were then separated and the carbinol was found to contain 2.68 mg. of $Pa^{231}$. The protactinium was removed from the organic solvent by contacting with 60 ml. of 10% hydrogen peroxide (one-fortieth by volume) and a second contact with 30 ml. of 5% hydrogen peroxide (one-eightieth by volume).

The diisopropyl carbinol is a particularly desirable organic extractant because of the low acidity range in which optimum results are obtained. However, other organic solvents are equally efficient in recovering the protactinium at the particular acidity ranges in which they best operate. Tributyl phosphate, for example, operates much like the diisopropyl carbinol and has the same dependency on aluminum ion concentration as does the diisopropyl carbinol. The tributyl phosphate, however, has the reverse acid dependency in that a rise in extractability of protactinium with increasing acidity is found up to about 5.5 M hydrogen ion concentration in the aqueous layer and is constant at higher acidities. Mixtures of 2-thenoyltrifluoroacetone in benzene, diisopropyl carbinol or diisopropyl ketone, as well as diisopropyl ketone alone are also efficient extractants in the recovery of protactinium. Several examples follow which illustrate the employment of other organic extractants. The aqueous acidic solution containing protactinium fluoride complex referred to in these examples is the one previously mentioned and described.

*Example III*

Ten ml. of the aqueous acidic protactinium fluoride solution was thoroughly mixed with 10 ml. of 0.5 N 2-thenoyltrifluoroacetone in benzene. To this mixture was then added 0.45 g. of aluminum nitrate and 0.65 g. of sodium aluminate. After a contact time of twenty minutes the phases were separated and it was found that 98% of the protactinium had been extracted into the organic phase.

*Example IV*

Ten ml. of the aqueous acidic protactinium fluoride solution and 10 ml. of the 0.5 N 2-thenoyltrifluoroacetone in diisopropyl ketone were intimately mixed. To this mixture was added 7.50 g. of aluminum nitrate and 5 ml. of 16 N nitric acid. After a contact time of fifteen minutes, the phases were separated and it was found that 94% of the protactinium had been extracted into the organic phase.

It will be understood that this invention is not to be limited to the details given herein but that it may be modified within the scope of the appended claims.

What is claimed is:

1. The method of recovering fluoride-complexed protactinium values from an aqueous acidic solution, which comprises mixing said solution with an organic solvent of the group consisting of alcohols, ketones and esters having at least six carbon atoms, fluorinated $\beta$-diketones and alkyl phosphates having at least twelve carbon atoms, and mixtures of these organic solvents, adjusting the acidity of said mixture to a 0.3–0.9 M hydrogen ion concentration, contacting said mixture with a source of aluminum ions whereby the protactinium fluoride complex is decomposed and the resulting protactinium ions are taken up by the organic phase, and separating the organic phase.

2. The method of recovering fluoride-complexed protactinium values from an aqueous acidic solution, which comprises mixing said solution with diisopropyl carbinol, adjusting the acidity of the aqueous phase of said mixture to a 0.3–0.9 M hydrogen ion concentration, introducing a source of aluminum ions into said mixture in quantity sufficient to furnish a concentration of 0.5–1.2 M aluminum ion, and separating the organic phase from the mixture.

3. The process of claim 2 wherein the acidity range is adjusted to 0.5–0.8 M hydrogen ion concentration and the aluminum ion concentration is adjusted to 1.0–1.2 M.

4. The method of recovering fluoride-complexed protactinium values from an aqueous acidic solution, which comprises mixing an aqueous acidic solution containing said protactinium values with a tributyl phosphate organic solvent, adjusting the acidity of the aqueous phase of the mixture so that the hydrogen ion concentration is greater than 5.5 M, and adding a source of aluminum ions to said mixture so that the aluminum concentration in the aqueous phase is 0.5–1.2 M in aluminum ion, and and then separating the organic phase containing protactinium values from the mixture.

5. The method of separating fluoride-complexed protactinium values from an aqueous acidic solution, which comprises mixing said solution with diisopropyl carbinol, and adding sufficient sodium aluminate to give a final hydrogen ion concentration of 0.6 M in the aqueous phase, and then adding sufficient aluminum nitrate to give an aluminum ion concentration of approximately 1.4 M in the aqueous phase, maintaining the aqueous and organic phases in intimate contact for approximately thirty minutes, and then separating the orgnic phase from the aqueous phase and removing the protactinium from the organic phase by contacting the organic phase with a quantity of 10% hydrogen peroxide solution sufficient to precipitate the protactinium values contained in the organic phase.

No references cited.